H. REICHARDT.
Reamer.

No. 213,937.  Patented April 1, 1879.

Witnesses
John Becker
Fred Haynes

Inventor
Heinrich Reichardt
by his Attorneys
Brown & Brown

UNITED STATES PATENT OFFICE.

HEINRICH REICHARDT, OF COLOGNE, GERMANY.

IMPROVEMENT IN REAMERS.

Specification forming part of Letters Patent No. 213,937, dated April 1, 1879; application filed February 8, 1879.

*To all whom it may concern:*

Be it known that I, HEINRICH REICHARDT, of Cologne, in the Empire of Germany, have invented a new and useful Improvement in Broaches, of which the following is a full, clear, and exact description, reference being had to the accompanying drawings, forming part of this specification:

This invention consists in a broach or tool for reaming out holes, having a series of facets formed by longitudinal grooves in the stock of the tool, and presenting a series of interrupted salient cutting-edges in direction of the length of the stock by means of a series of notches arranged spirally around the stock, whereby a light pressure suffices to screw or project the broach into the hole to be reamed; also, an effective cutting action and very perfect clearance are obtained. It is more especially designed for reaming out tapering holes, and may be made of flat steel, twisted while hot, whereby its durability and cutting action will be improved.

Figure 1:
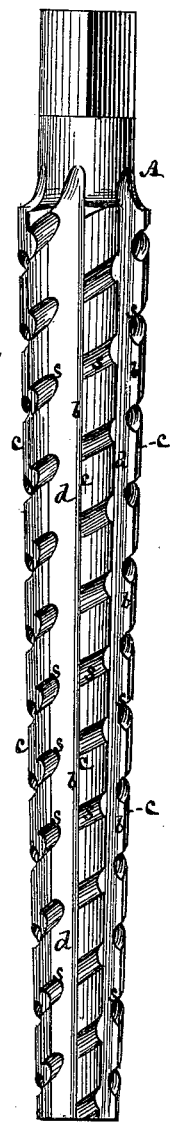
Figure 2:
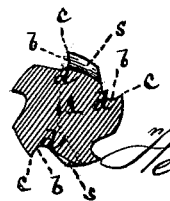

Figure 1 represents a longitudinal view of a broach constructed in accordance with my invention, and Fig. 2 a transverse section of the same.

A is the stock of the broach, which is of tapering form in direction of its length, and has five (more or less) facets, $b$, formed by longitudinal grooves $d$ in the stock, and presenting a series of salient cutting-edges, $c$, in direction of the length of the stock. These facets and salient edges are interrupted at regular or irregular distances throughout the length of the stock by means of a series of notches, $s$, arranged spirally around the stock, and intercepted by the longitudinal grooves $d$.

A broach thus constructed more readily enters the hole to be reamed, and has a very perfect cut and clearance.

What I claim as my invention, and desire to secure by Letters Patent, is—

A reaming tool or broach having a series of facets formed by longitudinal grooves in the stock, and having a series of interrupted salient cutting-edges, produced by notches arranged spirally around the stock, substantially as specified.

HEINRICH REICHARDT.

Witnesses:
EMILE BÜRGIN,
J. B. FELMER.